(12) United States Patent
Homer et al.

(10) Patent No.: US 8,520,393 B2
(45) Date of Patent: Aug. 27, 2013

(54) APPARATUSES AND METHODS FOR DISSIPATING HEAT FROM A COMPUTER COMPONENT

(75) Inventors: Steven S. Homer, Tomball, TX (US);
Dustin L. Hoffman, Cypress, TX (US);
Jeffrey A. Lev, Tomball, TX (US);
Mark S. Tracy, Tomball, TX (US); Luis C. Armendariz, Spring, TX (US); Mark H. Ruch, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 220 days.

(21) Appl. No.: 12/867,849

(22) PCT Filed: Apr. 1, 2008

(86) PCT No.: PCT/US2008/058986
§ 371 (c)(1),
(2), (4) Date: Aug. 16, 2010

(87) PCT Pub. No.: WO2009/123618
PCT Pub. Date: Oct. 8, 2009

(65) Prior Publication Data
US 2011/0110031 A1 May 12, 2011

(51) Int. Cl.
*H05K 7/20* (2006.01)

(52) U.S. Cl.
USPC ...... 361/719; 361/679.54; 361/709; 361/760; 165/122; 257/719

(58) Field of Classification Search
USPC ............. 361/679.46–679.47, 679.52, 679.54, 361/361/679.57–679.58, 688, 701–704, 707, 361/709–711, 715–722, 736, 747, 760, 783–789
See application file for complete search history.

(56) References Cited

U.S. PATENT DOCUMENTS

| | | | |
|---|---|---|---|
| 5,896,269 A | | 4/1999 | Autry |
| 5,969,940 A | * | 10/1999 | Sano et al. ............... 361/679.52 |
| 6,049,469 A | * | 4/2000 | Hood et al. .................. 361/818 |
| 6,205,026 B1 | | 3/2001 | Wong et al. |
| 6,469,893 B1 | * | 10/2002 | Frutschy et al. ............. 361/700 |
| 6,590,771 B2 | | 7/2003 | Sopko et al. |
| 6,639,800 B1 | | 10/2003 | Eyman et al. |
| 6,826,054 B2 | * | 11/2004 | Liu ............................... 361/719 |
| 6,865,082 B2 | * | 3/2005 | Huang et al. ................. 361/700 |
| 7,023,701 B2 | | 4/2006 | Stocken et al. |
| 7,024,573 B2 | | 4/2006 | Patel et al. |

(Continued)

FOREIGN PATENT DOCUMENTS

| WO | WO2006-129919 | 12/2006 |
|---|---|---|
| WO | WO2007-051727 | 5/2007 |

OTHER PUBLICATIONS

International Searching Authority, International Search Report & Written Opinion dated Dec. 17, 2008, pp. 10.

*Primary Examiner* — Courtney Smith

(57) ABSTRACT

Heat dissipation apparatus for dissipating heat generated by a heat-generating component mounted to a circuit board. In one embodiment, the heat dissipation apparatus includes a thermally-conductive heat sink adapted to be placed in contact with the heat-generating component, a bracket adapted to hold the heat sink in place relative to the heat-generating component, and a single coil spring mounted to the bracket adapted to urge the heat sink into contact with the heat-generating component.

16 Claims, 3 Drawing Sheets

(56) References Cited

U.S. PATENT DOCUMENTS

| | | |
|---|---|---|
| 7,042,727 B2 * | 5/2006 | Ulen et al. .................... 361/704 |
| 7,102,890 B2 | 9/2006 | Lee et al. |
| 7,142,427 B2 | 11/2006 | Reents |
| 7,209,354 B2 | 4/2007 | Wu et al. |
| 7,518,235 B2 * | 4/2009 | Coico et al. ................... 257/719 |
| 7,697,288 B2 * | 4/2010 | Okutsu ......................... 361/695 |
| 7,952,877 B2 * | 5/2011 | Okutsu ......................... 361/700 |
| 2001/0002729 A1 | 6/2001 | Wong et al. |
| 2002/0159233 A1 | 10/2002 | Patel et al. |
| 2006/0146499 A1 * | 7/2006 | Reents .......................... 361/704 |
| 2007/0200190 A1 * | 8/2007 | Koga ............................ 257/432 |
| 2009/0147480 A1 * | 6/2009 | Lee ............................... 361/719 |

* cited by examiner

APPARATUSES AND METHODS FOR DISSIPATING HEAT FROM A COMPUTER COMPONENT

BACKGROUND

Application Ser. No. 12/867,849 is a national stage entry of PCT/US2008/058986 filed Apr. 1, 2008. Various components provided within computers generate heat. For instance, chip-based components, such as processors, that are mounted on motherboards of such computers generate substantial amounts of heat. Normally, such heat must be dissipated to avoid failure of the heat-generating components.

Often times heat sinks, such as thermal dies, are placed in contact with the heat-generating components to draw the heat energy from the components. The level of heat transfer from the heat-generating component to the heat sink that can be attained depends at least in part on the level of contact between the component and the heat sink. Specifically, if the heat sink unevenly contacts the heat-generating component, heat transfer is impaired. Unfortunately, that is the case with many current designs in which the heat sink is urged into contact with the heat-generating component. In several such designs, a spring is provided at each corner of the heat sink. When the springs are not identical, for example due to manufacturing tolerance, an uneven pressure distribution may result.

BRIEF DESCRIPTION OF THE DRAWINGS

The disclosed apparatuses and methods can be better understood with reference to the following drawings. The components in the drawings are not necessarily to scale.

DETAILED DESCRIPTION

As described above, existing heat dissipation apparatuses that comprise multiple springs to urge a heat sink into contact with a heat-generating component may not apply even pressure to the heat sink and therefore may not achieve a desired level of heat transfer from the component to the heat sink. As described in the following, however, more even pressure distribution can be attainted when a single spring is used to urge the heat sink and the heat-generating component into contact with each other. In some embodiments, a heat dissipation apparatus includes first and second brackets are provided on opposite sides of a circuit board on which the heat-generating component is mounted. One of the brackets includes a single spring that contacts the circuit board (directly or indirectly) on a side opposite to the heat-generating component so as to pull a heat sink associated with the other bracket into contact with the component. Because only a single spring is used, the heat sink contacts the heat-generating component more evenly, thereby resulting in a desired level of heat transfer.

Figure 1:
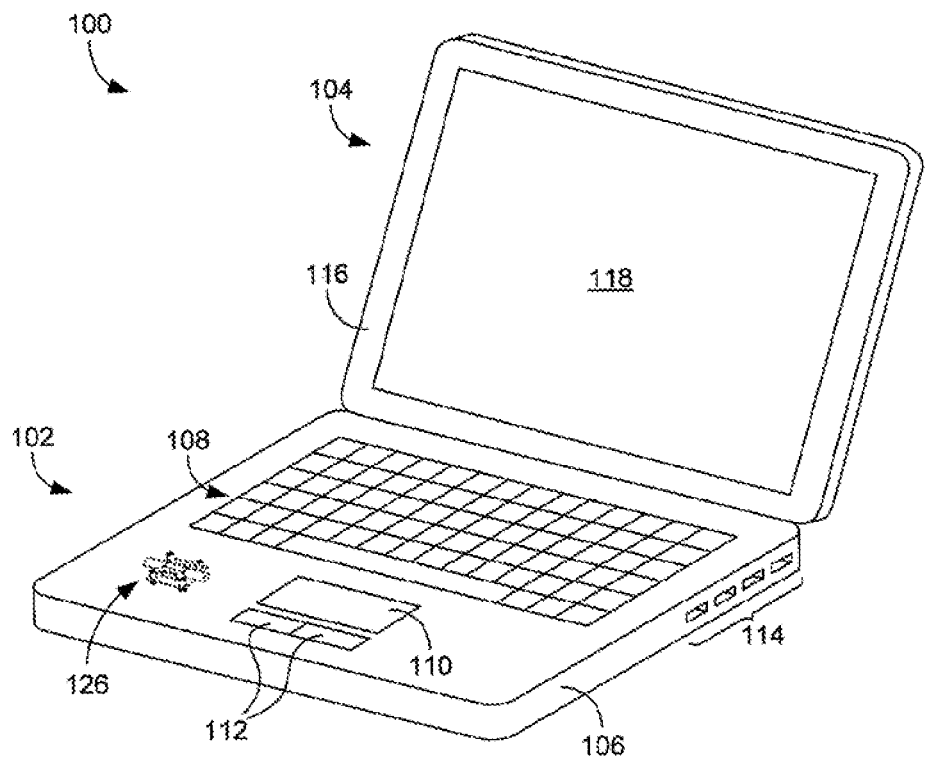
FIG. 1 is a perspective view of an embodiment of a computing device that comprises an apparatus for dissipating heat generated by a component provided within the computing device.

Referring now in more detail to the drawings in which like numerals indicate corresponding parts throughout the views, FIG. 1 illustrates a computing device 100 in the form of a notebook or "laptop" computer. Although a notebook computer has been explicitly illustrated and identified, it is noted that the notebook computer is cited only as an example. Therefore, the teachings of the present disclosure equally apply to other computing devices that comprise internal components that generate heat, such as server computers, desktop computers, and game consoles.

As indicated in FIG. 1, the computing device 100 includes a base portion 102 and a display portion 104 that, are attached to each other with a hinge mechanism (not shown). The base portion 102 includes an outer housing 106 that surrounds various internal components of the computing device 100, such as one or more processors, memory, a hard drive, and the like. Also included in the base portion 102 are user input devices, including a keyboard 108, a mouse pad 110, and selection buttons 112, as well as various ports or connectors 114 that are accessible through the housing 106. The display portion 104 includes its own outer housing 116 that supports a display 118. In some embodiments, the display 118 comprises a liquid crystal display (LCD). As is further depicted in FIG. 1 with hidden lines, the computing device 100, and more particularly the base portion 102, comprises an internal heat dissipation apparatus 126.

Figure 1A:
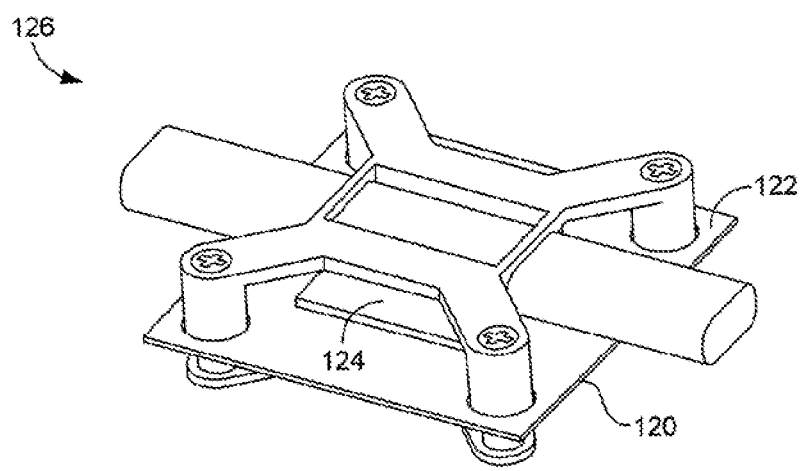
FIG. 1A is a perspective view of the heat dissipation apparatus shown in FIG. 1.

With reference to FIG. 1A, the heat dissipation device 126 is applied to a circuit board 120 (only a portion thereof shown in FIG. 1A), which is also provided within the base portion 102 of the computing device 100. In some embodiments, the circuit board 120 comprises a motherboard of the computing device 100. The circuit board 120 comprises a mounting surface 122 to which various components can be mounted, including a heat-generating component 124. By way of example, the heat-generating component 124 comprises a chip-based component, such as a central processing unit (CPU). The heat-generating component 124 can be mounted to the circuit board 120 in various ways. For example, the heat-generating component 124 can be soldered to the surface 122 of the circuit board 120 using a ball grid array (not shown).

Figure 2:
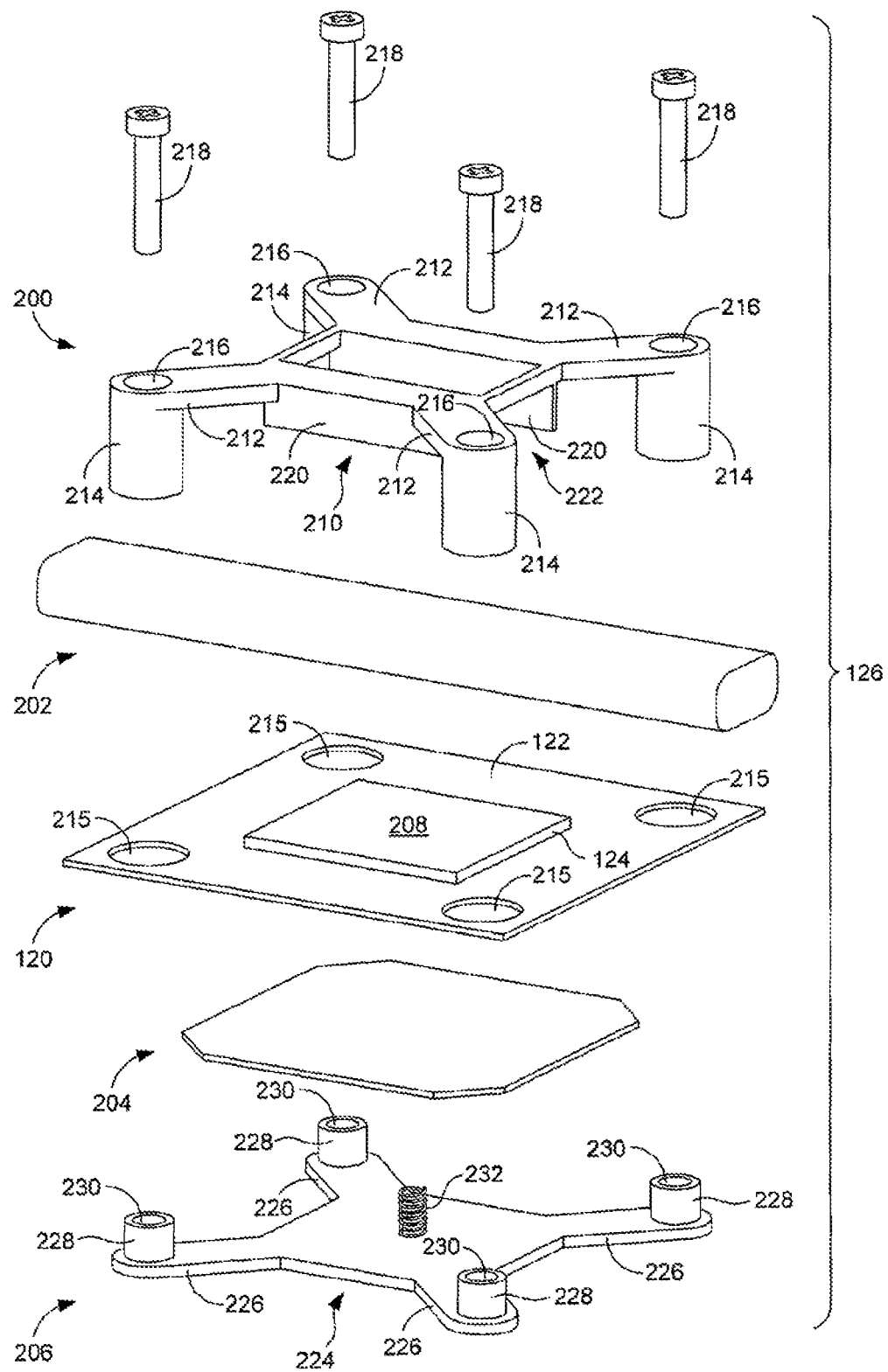
FIG. 2 is an exploded perspective view of the heat dissipation apparatus of FIG. 1A.

FIG. 2 illustrates an embodiment for the heat dissipation apparatus 126 in an exploded view. The apparatus 126 generally includes a first or top bracket 200, a heat sink 202, a force distribution member 204, and a second or bottom bracket 206. As is apparent from FIG. 2, the top bracket 200 and the heat sink 202 are provided on a first or top side of the circuit board 120 while the force distribution member 204 and the bottom bracket 206 are provided on a second or bottom side of the circuit board. As described below, that arrangement enables the top bracket 200 and the heat sink 202 to be drawn down into firm contact with a top surface 208 of the heat-generating component 124.

In the illustrated embodiment, the top bracket 200 includes a central body 210 from which extend multiple arms 212. As indicated in FIG. 2, each of the arms 212 extends from a corner of the body 210. Provided at the end of each arm 212 is a fastener receiving member 214. In the illustrated embodiment, the fastener receiving members 214 are formed as cylindrical members each having a vertically-oriented passage 216 that is adapted to receive a threaded fastener 218. As described below, the fasteners 218 extend through the passages 216 and into the bottom bracket 206 so as to secure the top bracket 200 to the bottom bracket and vice versa. The fastener receiving members 214 are configured to extend through openings 215 provided in the circuit board 202 but do not contact the edges of those openings to enable the heat dissipation apparatus 126 to freely move up and down relative to the circuit board and, therefore, the heat-generating component 124 (see FIGS. 3A and 3B). As described below, this enables the heat-generating component 124 to pivot to an orientation in which force is more evenly distributed across the surface area of the heat-generating component 124.

With further reference to FIG. 2, the top bracket 200 further includes opposed vertically-oriented walls 220 that define a space 222 that is adapted to receive the heat sink 202. In the illustrated embodiment, the heat sink 202 is formed as an elongated heat pipe that can be connected to a further heat dissipation apparatus, such as a heat exchanger (not shown). The walls 220 and the space 222 control the positioning of the heat sink 202 to ensure it is correctly aligned with the heat-generating component 124. The heat sink 202 is formed of a thermally-conductive material, such as metal (e.g., aluminum or copper).

Turning to aspects of the heat dissipation apparatus 126 provided on the other side of the circuit board 120, the force distribution member 204 comprises a planar member, such as a flat plate, that is positioned between the circuit board and the bottom bracket 206. In some embodiments, the force distribution member 204 is bonded to the bottom surface of the circuit board 120 (i.e., the surface opposite the mounting surface 122). The bottom bracket 206 is generally similar in form to the top bracket 200 and therefore includes a central body 224 having corners from which multiple arms 226 extend. Provided at the end of each arm 226 is a fastener receiving member 228 that include a threaded opening 230 into which the fasteners 218 can thread after passing through the passages 216 of the fastener receiving members 214 of the top bracket 200. The fastener receiving members 228 of the bottom bracket 206 can also be formed as cylindrical members. Regardless, the fastener receiving members 228 of the bottom bracket 206 are sized and configured so as to fit within the passages 216 of the fastener receiving members 214 of the top bracket 200.

With further reference to FIG. 2, the bottom bracket 206 includes a single spring 232 positioned in the center of the central body 224 and aligned with the center of the heat-generating component 124. In the illustrated embodiment, the spring 232 comprises a coil spring that is held in compression between the bottom bracket 206 and the circuit board 120 when the apparatus 126 has been assembled and applied to the heat-generating component 124.

Figure 3A:
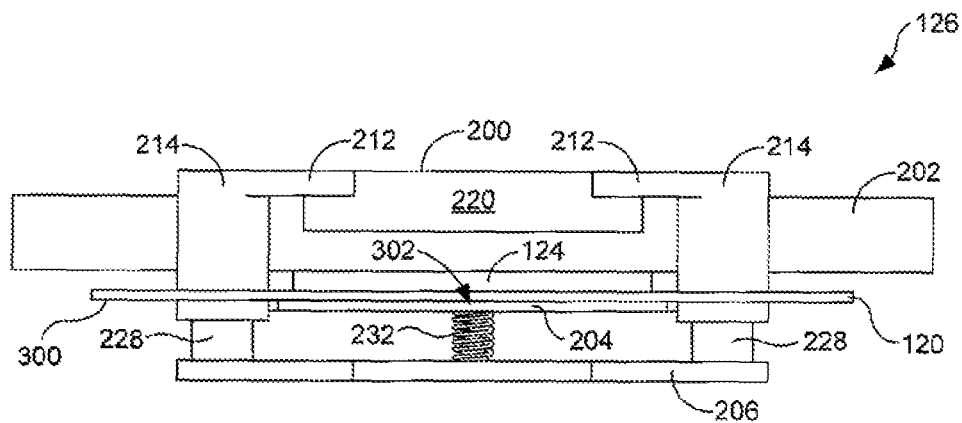
FIG. 3A is a side view of the heat dissipation apparatus of FIG. 2, the apparatus being shown in a first position.

FIG. 3A illustrates the heat dissipation apparatus 126 assembled and applied to the heat-generating component 124. As can be appreciated from FIG. 3A (with reference to FIG. 2), the force distribution member 204 has been bonded to the bottom surface 300 of the circuit board 120 and the fastener receiving members 214 of the top bracket 200 have been passed through the openings 215 provided in the circuit board 120. In addition, the fastener receiving members 228 of the bottom bracket 206 have been placed within the fastener receiving members 214 of the top bracket 200. When the two brackets have been so positioned, the fasteners 218 can be passed through the passages 216 provided in the fastener receiving members 214 of the top bracket 200 and threaded into the openings 230 of the fastener receiving members 228 of the bottom bracket 206. Once the two brackets have been secured together using the fasteners 218, the spring 232 contacts the force distribution member 204 at a single contact or pivot point 302 aligned with the center of the heat-generating component 124, which is mounted to the opposite side of the circuit board 120. The spring 232 is held in compression so as to force the bottom bracket 206 away (downward in FIG. 3A) from the circuit board 120, which is within the computing device 100. Because the top bracket 200 is secured to the bottom bracket 206, the top bracket is then pulled downward (in the orientation of FIG. 3A) toward the heat-generating component 124. As a result, the heat sink 202, which is positioned between the top bracket 200 and the heat-generating component 124, is urged into firm contact with the top surface 208 of the heat-generating component. Therefore, heat generated by the heat-generating component 124 can be transferred to the heat sink 202 to reduce the temperature of the component and reduce the likelihood of its failure. By way of example, the spring 232 causes the heat sink 202 to be pressed against the heat-generating component 124 with a force of approximately 8 kilograms (kg).

As described above, the heat dissipation apparatus 126 can freely move up and down relative to the circuit board 124 given that the fastener receiving members 214 of the top bracket 200 do not contact the openings 215 provided in the circuit board 120. Therefore, the heat dissipation apparatus 126 can freely pivot relative to the single pivot point 302, which coincides with the center of the heat-generating device 124. That pivoting capability enables the top bracket 200 to reach an equilibrium at which the force provided by the spring 232 is evenly distributed across the surface area of the heat-generating component 124.

Figure 3B:
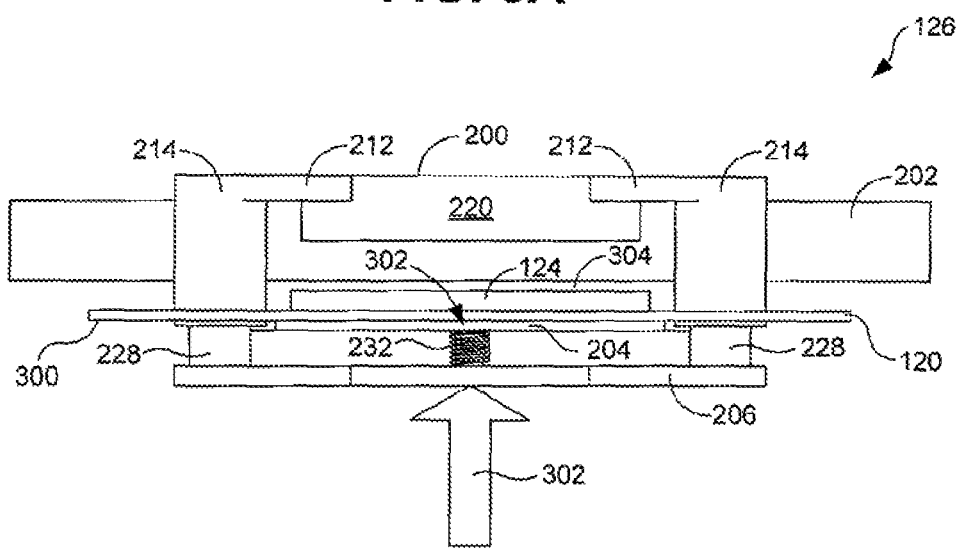
FIG. 3B is a further side view of the heat dissipation apparatus of FIG. 2, the apparatus being shown in a second position.

Referring next to FIG. 3B, the heat dissipation apparatus 126 has been displaced upward (in the orientation of the figure) by a force 302 to illustrate the ability of the apparatus to be displaced relative to the circuit board 120. As is apparent in FIG. 3B, as the bottom bracket 206 is moved toward the circuit board 120, the spring 232 is further compressed. As is also apparent in FIG. 3B, the top bracket 200 is displaced to an extent equal to the bottom bracket 206 such that the heat sink 202, which may be bonded to the top bracket, is spaced from the heat-generating component 124 by an air gap 304. Due to the freedom of movement of the heat dissipation apparatus 126, the apparatus can also pivot about the pivot point 302 as necessary to achieve even pressure distribution.

Figure 4:
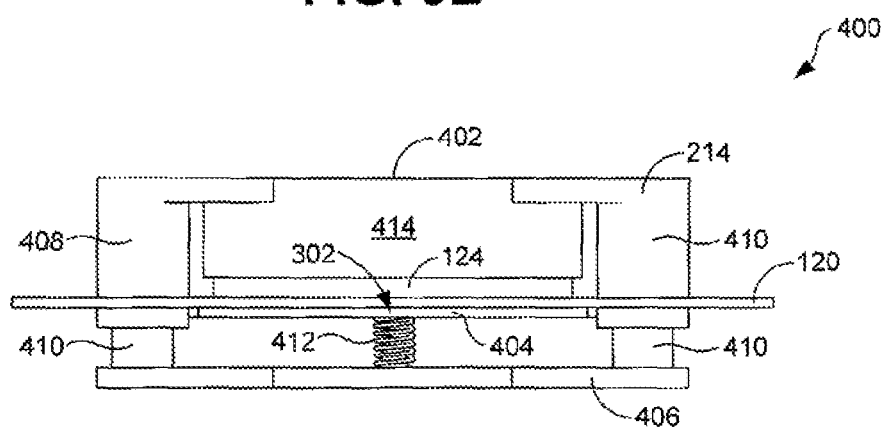
FIG. 4 is a side view of an alternative heat dissipation apparatus.

FIG. 4 illustrates an alternative embodiment for a heat dissipation apparatus 400. The apparatus 400 is similar in many ways to the apparatus 126. Therefore, the apparatus 400 includes a top bracket 402, a farce distribution member 404, and a bottom bracket 406. The top bracket 402 comprises fastener receiving members 408 and the bottom bracket 406 comprises fastener receiving members 410. In addition, the bottom bracket 406 includes a single spring 412 that defines a single pivot point for the apparatus 400. In the embodiment shown in FIG. 4, however, the top bracket 402 comprises an integrated heat sink 414 that is pressed into firm contact with the heat-generating component 124. Therefore, the apparatus 400 does not include the heat pipe described in the foregoing. Like that heat pipe, however, the heat sink 414 is composed of a thermally conductive material, such as a metal (e.g., aluminum or copper).

It is noted that various modifications of the disclosed apparatus are possible. For example, although first and second brackets have been described, the brackets could instead comprise a single integrated bracket, in which case the first and second brackets would be first and second portions of the same bracket.

Claimed are:

1. Heat dissipation apparatus for dissipating heat generated by a heat-generating component mounted to a circuit board, the heat dissipation apparatus comprising:
   a thermally-conductive heat sink to contact the heat-generating component;

a bracket having a first portion provided on a first side of the circuit board and a second portion provided on a second side of the circuit board, the first portion of the bracket to hold the thermally-conductive heat sink in place relative to the heat-generating component;

a spring mounted to the second portion of the bracket to urge the second portion of the bracket away from the circuit board so as to draw the first portion of the bracket toward the circuit board to urge the heat sink into contact with the heat-generating component; and a force distribution member disposed between the spring and the circuit board, wherein the force distribution member comprises a flat plate that is bonded to the circuit board.

2. The apparatus of claim 1, wherein the first bracket portion comprises an independent first bracket and the second bracket portion comprises an independent second bracket and wherein the first and second brackets are secured to each other.

3. The apparatus of claim 1, wherein the first bracket portion comprises a body and a plurality of arms that extend from the body.

4. The apparatus of claim 3, wherein the first bracket portion further comprises fastener receiving members provided at the ends of the arms.

5. The apparatus of claim 1, wherein the second bracket portion comprises a body and a plurality of arms that extend from the body.

6. The apparatus of claim 5, wherein the second bracket portion further comprises fastener receiving members provided at the ends of the arms.

7. The apparatus of claim 1, wherein the heat sink comprises a heat pipe.

8. The apparatus of claim 1, wherein the heat sink comprises an integral part of the first bracket portion.

9. The apparatus of claim 1, wherein the spring comprises a coil spring.

10. The apparatus of claim 1, wherein the spring is positioned in the center of the second bracket portion.

11. The apparatus of claim 1, wherein the spring is positioned on the bracket so as to align with the heat-generating component.

12. The apparatus of claim 1, wherein the apparatus comprises no other springs that urge the heat sink into contact with the heat-generating component.

13. Heat dissipation apparatus for dissipating heat generated by a heat-generating component mounted to a mounting surface provided on a first side of a circuit board, the heat dissipation apparatus comprising:

a thermally-conductive heat sink to contact the heat-generating component;

a first bracket to couple to the first side of the circuit board, the first bracket to hold the heat sink in place relative to the heat-generating component, wherein the thermally-conductive heat sink is integral with the first bracket;

a second bracket to couple to a second side of the circuit board opposite to the first side, the second bracket comprising a body; and a spring mounted in a central position on the body of the second bracket act the circuit board at pivot point aligned with a center of the heat-generating component, wherein the spring is to urge the second bracket away from the circuit board to draw the first bracket toward the circuit board to urge the heat sink into contact with the heart-generating component.

14. The apparatus of claim 13, wherein the heat sink comprises a heat pipe.

15. The apparatus of claim 13, wherein the spring comprises a coil spring.

16. The apparatus of claim 13, wherein the circuit board comprises a force distribution member bonded to the circuit board that the spring is to contact.

* * * * *

UNITED STATES PATENT AND TRADEMARK OFFICE
CERTIFICATE OF CORRECTION

PATENT NO. : 8,520,393 B2
APPLICATION NO. : 12/867849
DATED : August 27, 2013
INVENTOR(S) : Steven S. Homer et al.

It is certified that error appears in the above-identified patent and that said Letters Patent is hereby corrected as shown below:

In the Claims

In column 6, line 24, in Claim 13, after "bracket" delete "act" and insert -- to contact --, therefor.

In column 6, line 29, in Claim 13, delete "heart-" and insert -- heat- --, therefor.

Signed and Sealed this
Twelfth Day of November, 2013

Teresa Stanek Rea
*Deputy Director of the United States Patent and Trademark Office*